No. 825,655. PATENTED JULY 10, 1906.
J. H. JESSEN.
FERTILIZER SPREADER.
APPLICATION FILED APR. 24, 1905.
3 SHEETS—SHEET 3.
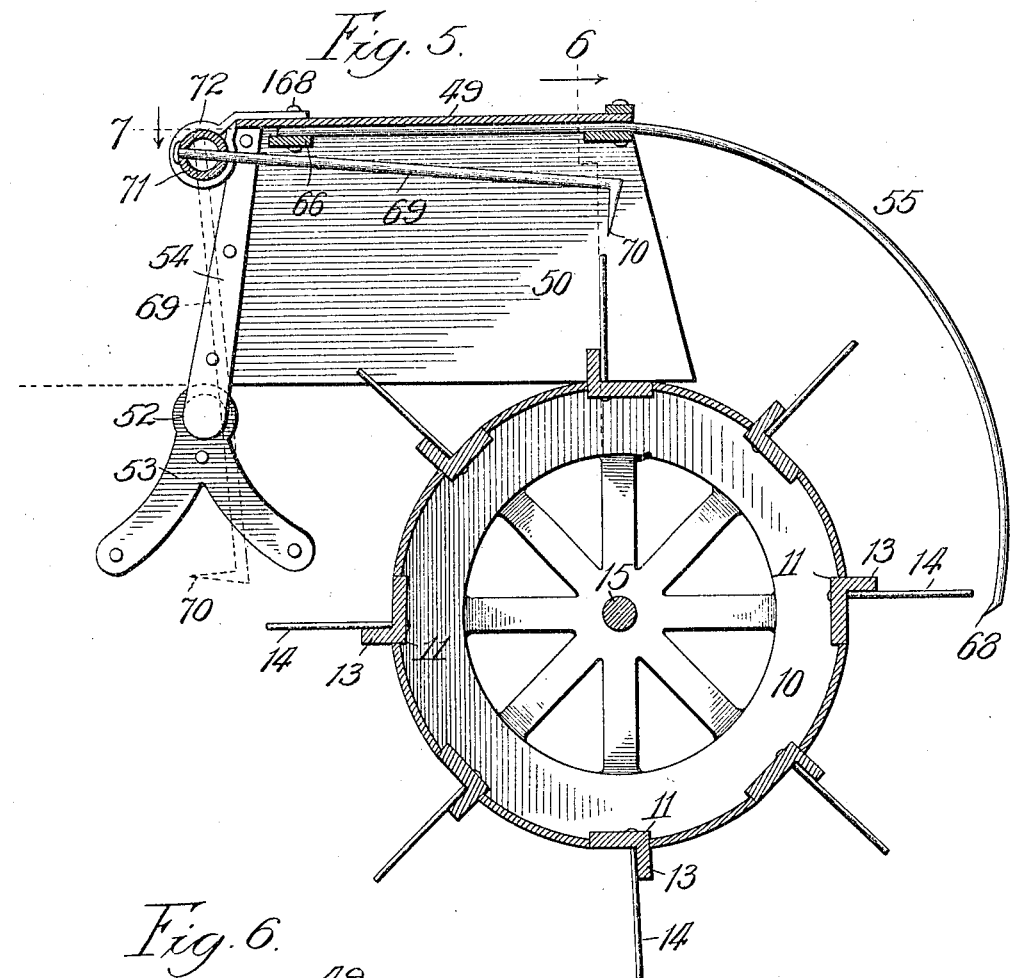
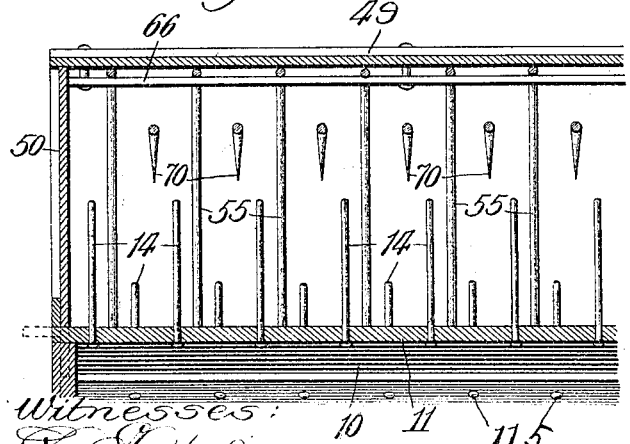
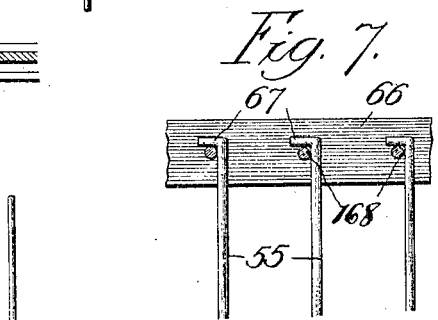
Witnesses:
Chas. E. Gaylord.
John Enders.
Inventor:
John H. Jessen,
By Thomas F. Sheridan,
Att'y

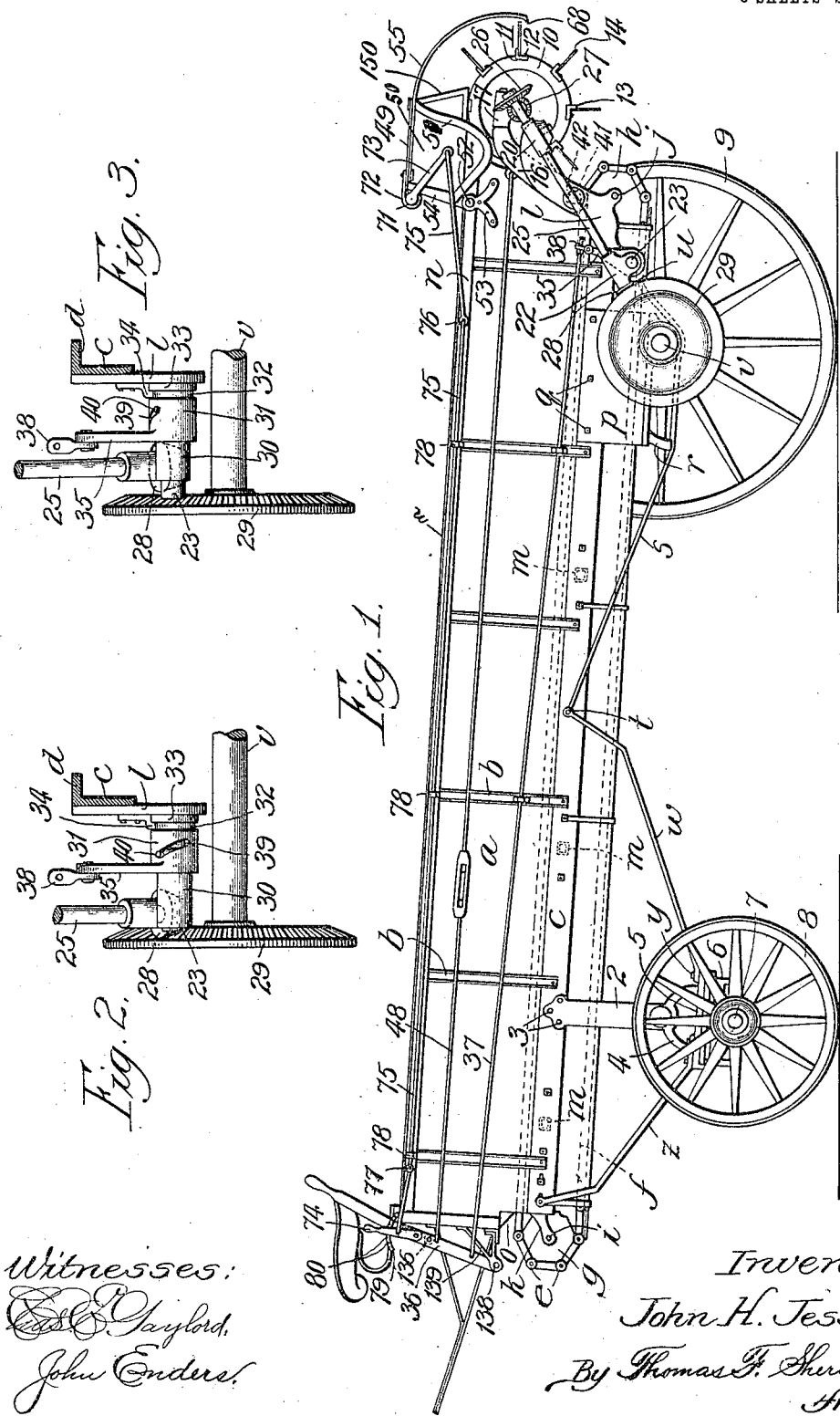

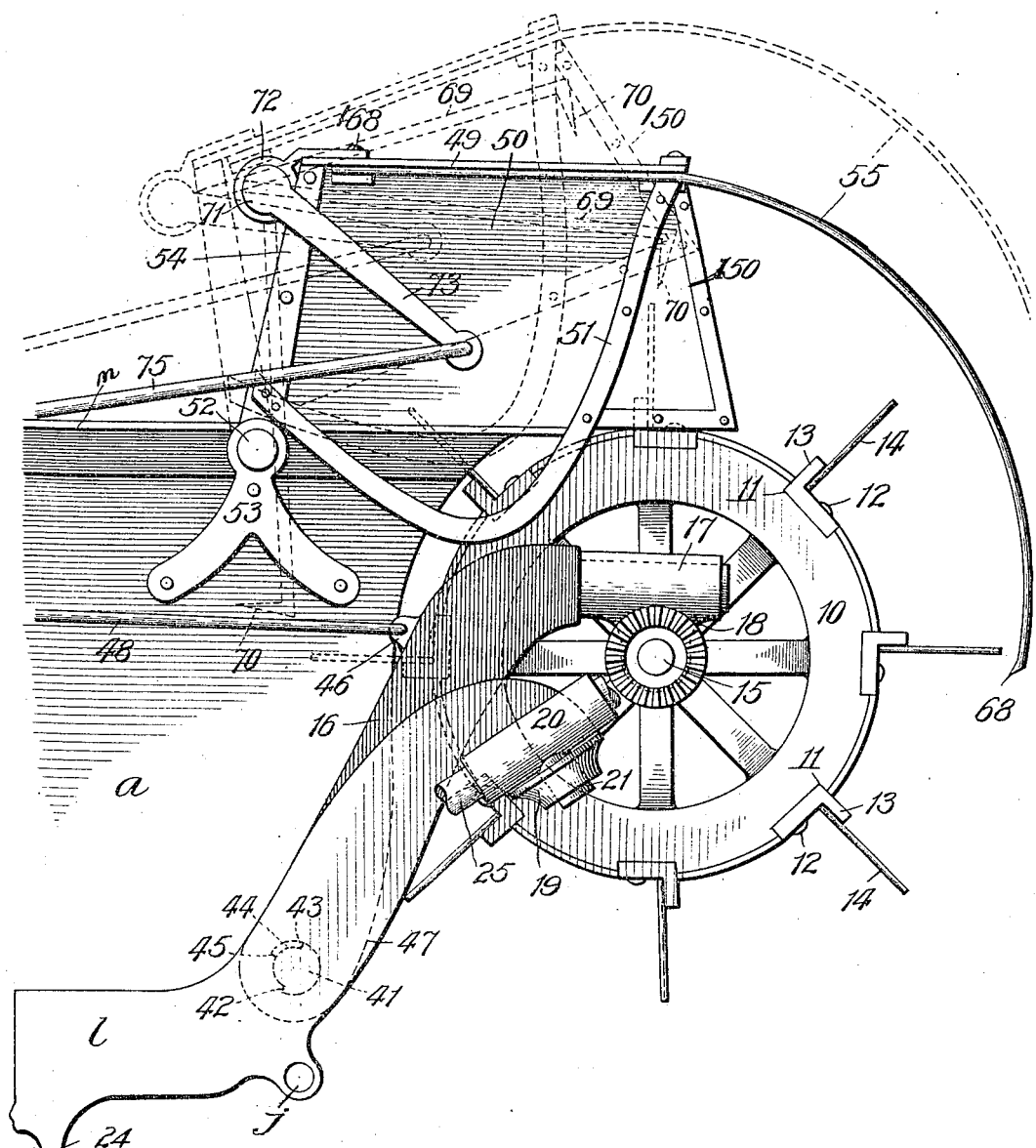

UNITED STATES PATENT OFFICE.

JOHN H. JESSEN, OF RENSSELAER, INDIANA.

FERTILIZER-SPREADER.

No. 825,655.       Specification of Letters Patent.       Patented July 10, 1906.

Application filed April 24, 1905. Serial No. 257,204.

*To all whom it may concern:*

Be it known that I, JOHN H. JESSEN, a citizen of the United States, residing in Rensselaer, county of Jasper, and State of Indiana, am the inventor of certain new and useful Improvements in Fertilizer-Spreaders, of which the following is a specification.

My invention relates to that class of fertilizer-spreaders having a suitable receptacle for containing the fertilizer, means for discharging the fertilizer, and means for beating or pulverizing it.

The principal object of my invention is to provide a simple, economical, and efficient fertilizer-spreader.

A further object is to provide a fertilizer-spreader having an endless traveling apron with a suitable device for pulverizing and discharging the fertilizer when in operation and adapted to be readily thrown into and out of operative connection with the driving mechanism.

A further object is to provide in a fertilizer-spreader having a rotatable toothed device for beating and discharging the fertilizer suitable movable hood and tooth or arm mechanism coöperating with the rotatable beater for pulverizing the material or retaining it, as desired, and adapted to be moved into and out of operative position with relation to the rotatable beater or discharge mechanism.

A further object is to provide suitable means for supporting the rotatable beater and for moving it toward and from the endless apron and the fertilizer to be operated upon.

Other and further objects of the invention will appear from an examination of the drawings and the following description and claims.

The invention consists in the features, combinations, and details of construction hereinafter described and claimed.

In the accompanying drawings, Figure 1 is a side elevation of a fertilizer-spreader constructed in accordance with my improvements with one of the rear supporting-wheels removed to show the mechanism for operating the beater; Fig. 2, an enlarged detail view in elevation of the mechanism for supporting and throwing the driving-gear mechanism into and out of gear; Fig. 3, a view of the parts shown in Fig. 2, showing the gear mechanism out of gear; Fig. 4, an enlarged detail view in elevation of the pulverizer mechanism consisting of the movable hood, the movable teeth or arms connected with such hood above the rotatable beater, and the rotatable beater mounted upon the pivoted supporting-arm mechanism, a part of the gear-shaft, with its gear-wheel for driving the beater, being removed; Fig. 5, an enlarged sectional elevation of the rotatable beater and the hood and pulverizer-arm and hooked tooth mechanism; Fig. 6, a transverse sectional elevation taken on line 6 of Fig. 5, showing a part of the beater mechanism and the pulverizer-arm mechanism; and Fig. 7 a detail plan view of the portion of the hood, showing the manner of mounting the curved pulverizer-arms thereon.

In constructing a fertilizer-spreader in accordance with my improvements I provide a suitable receptacle or box having side frames formed, preferably, of metal and having a bottom frame and tracks also formed, preferably, of metal. The box here shown comprises side frames formed of metallic plates *a*, metallic side stakes *b*, preferably in the form of channel-irons, longitudinal metallic side sills *c*, formed of angle-irons, having inwardly-projecting upper flange portions *d*, forming tracks upon which apron-rollers *e* support the upper lap of a traveling endless apron *f*, which forms a movable bottom portion for the box. The traveling apron extends from end to end of the box, being mounted at opposite ends thereof upon sprocket-wheels *g* and *h*, which are supported in fixed relation to shafts *i* and *j*, respectively, such shafts being rotatably mounted in the main frame by means of brackets *k* and *l*, respectively. These shafts may be mounted in any ordinary and well-known manner.

Transverse beams or connecting members *m* extend across the bottom of the framework or bed at suitable intervals and are formed, preferably, of metallic square or angular pipe-sections having their opposite ends secured to the metallic side sills in any ordinary and well-known manner and being located between the upper and lower laps of the endless apron above-mentioned. Angle-irons *n* are secured to the top of the side plates and in the same vertical plane with the longitudinal side sills, so that the side frames thus form plate-girders, the top cord of which is formed by the angle-irons *n*, and the bottom cord of which is formed by the longitudinal side sills or tracks.

A front end board or plate extends from side frame to side frame and is made, preferably, of sheet metal, the front end portion of the bed being open at its bottom portion o for permitting the endless apron to pass beyond the end of the bed and around its supporting-sprockets. The rear end of the bed is open except to the extent that the beater and pulverizer mechanism, hereinafter described, serves to retain the fertilizer while such parts are stationary.

Metallic side plates or brackets p are secured to the rear portion of the metallic side sills or tracks on opposite sides of the box by means of bolts q and have depending leg portions r in engagement with truss-rods s, secured to the side sills forward of the rear axle and to the side frames at the point indicated by the reference-letter u rearward of the rear axle. These supporting-plates p are provided at or near their rear ends with suitable journal-bearings in which the rear axle v is rotatably mounted above the truss-rod, already described. By this arrangement it will be seen that these supporting-plates form struts between the side sills and truss-rods and that the framework is thus trussed on each side so as to prevent the sagging of either of the front corners of the vehicle. Brace-rods w are also secured, preferably, to the side sills and extend downward and inward at an incline toward the front end of the vehicle, being secured, by means of a bolt or rivet y or in any ordinary and well-known manner, to the fifth-wheel, and a brace z extends upward and forward at an incline from the fifth-wheel and is secured to the front end of the side sill. The front end of the vehicle-framework is supported upon a front bolster or supporting-bracket 2, which is secured, preferably, to the side sills by means of bolts 3 or in any ordinary and well-known manner, the lower portion of such front bolster being secured, by means of a bracket 4, to the upper member 5 of the fifth-wheel. This upper member of the fifth-wheel has a horizontal bottom bearing-surface resting upon a horizontal top bearing-surface portion of a supporting member 6, which is pivotally mounted and secured to the front axle 7. A pair of front supporting-wheels 8 are rotatably mounted upon the front axle, and rear supporting-wheels 9 are mounted in fixed relation to the rear axle, so that the rotation of the rear wheels will cause the axle to rotate and drive the endless apron which is operatively connected therewith in the manner described in my application, Serial No. 257,203, filed of even date herewith. The rear axle also drives the beater and discharge mechanisms hereinafter described.

The beater-discharge mechanism comprises a rotatable toothed drum having a hood and rearwardly-extending hooked teeth or arms movably mounted over such drum, pulverizer hooks or teeth being also movably mounted in the hood and adapted to coöperate with the rotatable toothed drum. The rotatable beater or drum is formed of circular end portions or heads 10, preferably of metal, having slats or paddles 11 extending from end to end of the drum and secured thereto by means of rivets or bolts 12. These slats or paddles are preferably in the form of angle-irons having integral flange portions 13, which extend outward from the periphery of the drum forming paddle portions, and metallic teeth 14 are mounted in such slats extending outward beyond the flange or paddle portions thereof in staggered relation to the teeth of the next adjacent slat, as indicated in Fig. 6. All of these teeth are mounted in perforations 115 in the metallic angle members or slats and are preferably in engagement with the outwardly-extending flange portions of the paddles. The paddle or flange portions of these slats are adapted to carry up and discharge the lighter and finer particles of the fertilizer and spread it evenly, and the teeth are adapted to tear and pulverize the material while also serving to discharge it from the vehicle. This beater-drum is mounted on and in fixed relation to a shaft 15, which is in turn rotatably mounted in bearing-boxes 17, which are loosely or pivotally suspended from the rear upper ends of the brackets or arms 16. These arms 16 are pivotally mounted upon brackets l by means of shouldered pivots 41, which permit limited pivotal movements of such pivoted arms and beater in a vertical plane. The journal-bearings of the shaft of the beater are in depending portions 18 of the pivotally-suspended bearing-boxes 17, so that the bearing-boxes and beater have sufficient freedom of movement transversely of the vehicle to enable the beater-drum to automatically aline itself.

The drum-supporting brackets l are each provided with a laterally-extending perforated supporting-flange 19 at their upper ends adjacent to the beater-drum and upon which is mounted a bearing-box or sleeve 20, which is pivotally secured to the flange portion of such bracket by means of a stud 21, which extends rotatably through a perforation in such flange.

A bearing box or sleeve 22 is pivotally mounted, by means of a stud 23, upon the lower portion of each bracket l, already described, which brackets support the pivoted arms 16. Each of these studs extends through a perforation 24 in said bracket in a horizontal direction transversely with relation to the vehicle, so as to permit the rotation of the bearing-box in a vertical plane. The stud or stub shaft 23 may be mounted on a portion of the frame of the vehicle, if desired; but I prefer the form of mounting here shown. An inclined driven gear-wheel shaft 25 is rotatably mounted in the pivoted bearing-boxes 20 and 22 and is provided with a bevel gear-wheel 26 at its upper rear end, which meshes with a bevel gear-wheel 27 upon the drum or drum-supporting shaft, and a lower bevel gear-wheel 28 is mounted upon the lower end of such rotatable shaft movable into and out of engagement with the bevel gear-wheel 29, which is upon and in fixed relation to the rear axle $v$ of the vehicle.

The manner in which the bearing-boxes are pivotally mounted permits sufficient movement of the lower end of this inclined driven gear-wheel shaft to enable the lower gear wheel or pinion to be moved into and out of operative engagement with its driving-gear wheel without materially affecting the gear mechanism at the upper end of such shaft.

In order to provide means for throwing the lower gears into and out of gear, the bearing-box 22 is provided with a preferably integral sleeve portion 30, which is loosely mounted on the stub-shaft 23, so as to permit it to slide longitudinally of such stub-shaft and also rotate thereon, the stub-shaft being mounted in a perforation 24 in one of the brackets $l$, which are attached to the side framework of the vehicle.

A sleeve 31, having an annular slot 32, forming an annular end or shoulder portion 33 in engagement with a securing-lug 34, is rotatably mounted upon the sleeve portion 30 of the bearing-box 22, already described, and a lever-arm 35, preferably integral with the sleeve 31, is connected with an operating-lever 36 by means of a connecting-rod 37 in threaded engagement with a link 38, which is pivotally connected to such lever 35. The sleeve 31 is provided with an elongated peripheral slot 39, which extends at an incline partly around and longitudinally of such sleeve, as shown in Fig. 2, and a pin 40, which projects from the sleeve portion 30 of the pivoted bearing-box 22, is mounted in such inclined elongated slot, so that the movement of the operating-lever 36 to its rearward position, as shown in Figs. 1 and 2, will cause the gear mechanism to be thrown into gear or into operative position, and the forward movement of such operating-lever will throw the gear mechanism out of gear and cause the parts to assume the position shown in Fig. 3. When in gear it will be readily seen that the movement of the vehicle forward will cause the rotation of the rear axle, and thus drive the inclined shaft 25, and thereby the rotatable beater, so that the beater will revolve in a direction opposite to the direction of rotation of the supporting-wheels. The rear axle $v$ is also provided with gear mechanism, by means of which it is operatively connected with the endless apron, as above suggested. This connection may be made in any ordinary and well-known manner, my preferred mechanism being more particularly described in my application filed of even date herewith. It therefore need not be illustrated or described in detail herein.

In order to provide means whereby the revolving beater-drum may be moved toward and from the rear portion of the endless apron and toward and from the material to be operated upon, the beater-drum-supporting arms 16, one of which is mounted on each side of the vehicle, are each pivotally mounted at their lower ends upon the brackets $l$. In order to accomplish this, the beater-supporting arms are each provided with a stud 41, having shoulders 42 and 43, such stud being rotatably mounted in a perforation 44, having an inwardly-projecting shoulder portion 45, adapted to engage the shoulders of the studs and limit the pivotal movement of the arms 16 and the beater-drum supported thereby. These shouldered studs and perforations thus permit partial but prevent complete rotation of the pivoted arms and support the arms and drum in both its raised and lowered positions.

The pivoted arms 16 are each provided with a perforated lug 46 near their upper ends and are connected, by means of a connecting-rod 48, which enters the perforation in such lug, preferably with the operating-lever 36, already described, or a similar separate lever, if desired, at the front of the vehicle. The pivoted supporting-arms being rotated to the rearward position (shown in Fig. 4) will cause the rotatable beater-drum to assume its rearward and lowermost position, as indicated in said figure. The movement of the lever 36 with the pivoted supporting-arms 16 forward to a position where the shoulder 43 of the stud will engage the shoulder portion 45 of the bracket will raise the rotatable beater-drum and at the same time move it forward into position to retain the contents of the receptacle when the beater-drum is not in active operation. It will be noted that the movement of the drum is forward and upward, describing the arc of a circle, the center of which is the pivot 41, and that the drum may thus be kept very close to the endless apron in both its raised and lowered positions. When in raised forward position, the drum is thus enabled to retain the contents of the receptacle, and when in lowered rear position it is sufficiently close to the traveling apron so that its revolving teeth will prevent any undesirable discharge of material between the revolving apron and the ends of such teeth. It will also be noted that the forward movement of the operating-lever 36, which is connected with the lever 35 by means of the rod 37, throws the driving-gears out of operative position and also throws the revolving toothed drum forward and upward at the same time to raised stationary position and that the rearward movement of the levers 35 and 36 throws the driving-gear mechanism into operative position and the drum downward and to rearward position, the inclined shaft 35 having sufficient freedom of transverse movement in the bearing-boxes 20 and 22 to permit such movements of the beater and the gear mechanism.

The movement of the beater upon its supporting-arms enables it to be moved downward and rearward out of contact with the fertilizer before being set in rotation, and the fertilizer is then gradually brought backward toward the beater or discharge toothed drum to be operated upon thereby. The drum may remain in rearward lowered position while in active operation. Only one connecting-rod 48 is shown. There are, however, two of these rods, counterparts of each other, one on each side of the vehicle or receptacle, and both are secured in the same manner to pivoted arms 16 on opposite sides of the receptacle and to the lever 36. The lever 36 is mounted in fixed relation to a shaft 138, which extends transversely across the bed or framework, being rotatably mounted brackets 139 on each side of the frame, and a fork 136 of the lever 36 is secured to the shaft on the side of the vehicle opposite that shown in Fig. 1, the top of the fork 136 being indicated in dotted lines on said Fig. 1. This connecting-rod 48 is connected to the forked portion of this operating-lever in the same manner as the rod shown in Fig. 1.

A movable hood and pulverizer for the beater is formed of a top plate 49, made, preferably, of metal which extends transversely across the vehicle above the rotatable beater. Side shields 50, formed of metallic plates, are connected to such top plate at the opposite ends thereof and extend downward to or below the upper edge of the box, so as to form side shields or fenders adapted to prevent the escape of the material thrown up by the revolving beater.

The side portions of the hood are provided with reinforcing irons or braces 150 and 51, the latter being curved and extending below the upper edge of the box, so as to form a shield when the hood is in either its raised or lowered position. This hood and pulverizer is pivotally mounted at its front lower corners upon the frame by means of studs 52, which extend into perforations in supporting-brackets 53, secured to the sides of the bed or framework. A strengthening metallic piece 54 extends along the front edge of each side frame, forming a suitable depending portion for pivotally supporting the hood. The pivots or studs 52 may be secured to these strengthening-pieces or extend into perforations in the lower portion thereof.

Rearwardly and downwardly curved pulverizer guard-arms 55 extend beneath the top plate of the hood over and to the rear of the rotatable toothed beater and are secured to the front upper portion of the hood and pulverizer, as indicated in Figs. 4 and 7, their front ends being arranged between transversely-extending cleats 66 and the top plate, each of such arms having a hook portion 67, extending back of a rivet or bolt 168, which secures such cleat to the top plate and securely holds the pulverizer-arms in place. The lower end of each of these curved pulverizer-arms is provided with an inwardly or forwardly projecting hook portion 68 adjacent to the ends of the revolving beater-teeth and preferably in staggered relation thereto, as indicated in Fig. 6.

Adjustable pulverizer-teeth 69, having hooked ends 70, are mounted in the hood by means of a hollow shaft 71, which extends across the hood near its upper front portion and is rotatably supported upon the hood in brackets 72. The upper front ends of the hooked teeth or arms 69 are mounted in this shaft, as shown in Fig. 5, so as to swing with the rotation of this shaft. This rotatable shaft is provided with a lever-arm 73, which is connected with an operating-lever 74 by means of a connecting-rod 75, which is here shown articulated or provided with joints 76 and 77, such rod being slidably mounted in brackets 78. By this means the hooked pulverizer-teeth 69 may be lowered to vertical position, as shown in dotted lines in Fig. 4, or raised to substantially horizontal position, so that their hooks are adjacent to the revolving teeth of the beater, as shown in dotted lines in said figure. This may be accomplished by operating the lever 74 in the desired direction. When the hooked pulverizer-teeth are in vertical or lowered position, they form supports for retaining the contents of the vehicle when the beater is stationary. When they are in raised position, their hooked points are adjusted up or down as desired by moving the operating-lever 74 backward or forward and securing it in any desired adjusted position by means of the segment 79 adjacent to such lever, the lever being provided with a pawl which may be of any ordinary known type and adapted to engage the notches 80 of such segment. The lever 74 and segment 79 are both mounted upon the lever 36, as shown in Fig. 1. By this arrangement it will be seen that the degree of fineness to which the material is to be pulverized may be governed by raising or lowering the hooked points of the pulverizer-teeth. It will also be noted that in case of any large piece or pieces of material being discharged between the revolving beater and the pulverizer-teeth, such as cannot be pulverized by the device, the hood will rise automatically, so as to permit such obstacle to be thrown out without injury to the device, and the pulverizer-teeth and hood will automatically return to operative position when such obstacle has been discharged. Such obstacles will first strike the hooked pulverizer-teeth 69 and raise them, and the hood will be raised by such teeth, which yield sufficiently to protect the hood from the sudden shock which it would otherwise receive. The curved arms are thus entirely protected, being raised entirely out of the way of the obstacles.

The entire device with the exception of the supporting-wheels is made of metal and is of the lightest possible construction consistent with the stresses to which it is subjected in use.

I claim—

1. In a fertilizer-spreader, the combination of a portable receptacle having side frames and an open rear end portion, a rotatable beater mounted adjacent to the open rear end portion and provided with trunnions, supporting-arms pivotally secured to the rear end portion of the receptacle, transversely-movable bearing-boxes pivotally suspended on said supporting-arms in which bearing-boxes the trunnions of the beater are journaled, mechanism for operating the pivoted supporting-arms, and a movable apron forming a bottom for the receptacle.

2. In a fertilizer-spreader, the combination of a portable receptacle, beater-supporting arms pivotally mounted and supported by such receptacle, a beater rotatably mounted upon the swinging ends of such pivotal supporting-arms and movable therewith to raised forward position and rear lowered position, gear and shaft mechanism operatively connected with such vehicle-supporting wheels and with the rotatable beater for rotating the beater, and means for throwing such gear mechanism into and out of operative position.

3. In a fertilizer-spreader, the combination of a portable receptacle, beater-supporting arms pivotally mounted, a beater rotatably mounted upon the swinging ends of such pivotal supporting-arms and movable therewith to raised forward position and rear lowered position, vehicle-supporting wheels, a rotatable axle mounted in fixed relation to such supporting-wheels, a driving gear-wheel upon such axle, a rotatable shaft provided with gear mechanism at one end thereof adapted to be operatively connected with and disconnected from such driving gear-wheel and provided with gear mechanism at its opposite end operatively connected with the rotatable beater, a supporting-bracket mounted upon the framework of the receptacle, and bearing-boxes movably mounted upon such bracket for supporting such shaft.

4. In a fertilizer-spreader, the combination of a portable receptacle, beater-supporting arms pivotally mounted, a beater rotatably mounted upon the swinging ends of such pivotal supporting-arms and movable therewith to raised forward position and rear lowered position, a rotatable shaft provided with gear mechanism at one end thereof adapted to be operatively connected with and disconnected from the supporting driving-wheels of the vehicle and to be driven thereby and provided with gear mechanism at its opposite end operatively connected with the rotatable beater, a supporting-bracket mounted upon the framework of the receptacle, forward and rear bearing-boxes movably mounted upon such supporting-bracket for supporting such shaft, and means for moving the forward bearing-box and thereby the gear-wheel at the forward end of such shaft into and out of operative position.

5. In a fertilizer-spreader, the combination of a portable receptacle, beater-supporting arms pivotally mounted, a beater rotatably mounted upon the swinging ends of such pivotal supporting-arms and movable therewith to raised forward position and rear lowered position, vehicle-supporting-wheel mechanism, an axle rotatably mounted in fixed relation to such vehicle-supporting-wheel mechanism, a bevel-gear mounted upon such axle in fixed relation thereto, a rotatable shaft provided with gear mechanism operatively connected with the beater and having a gear-wheel mounted thereon movable into and out of engagement with the gear-wheel upon such rotatable axle, and means for moving such last-mentioned gear-wheel into and out of engagement with the axle gear-wheel.

6. In a fertilizer-spreader, the combination of a portable receptacle, beater-supporting arms pivotally mounted, a beater rotatably suspended from the swinging ends of such pivotal supporting-arms and movable therewith to raised forward position and rear lowered position, vehicle-supporting-wheel mechanism, a rotatable shaft mounted in fixed relation to such vehicle-supporting-wheel mechanism and provided with a driving gear-wheel thereon, shaft and gear mechanism operatively connected with such beater and with the driving gear-wheel, means for throwing such gear mechanism into and out of operative position, and means for moving the pivoted beater-supporting arms and thereby the beater to forward raised position and rear lowered position.

7. In a fertilizer-spreader, the combination of a portable receptacle, a rotatable beater, a hood extending over the beater pivotally secured to the receptacle at points forward of the axial center of the beater whereby the hood may be raised away from the beater said hood being provided with pulverizer-arms having hooks upon their ends extending rearward over the beater, and means for rotating the beater.

8. In a fertilizer-spreader, the combination of a receptacle, a rotatable beater provided with tooth mechanism, a hood extending over the beater and pivotally secured at points forward of the axial center thereof, and pulverizer-teeth movably mounted and extending beneath such hood adjacent to the teeth of the rotatable beater.

9. In a fertilizer-spreader, the combination of a receptacle, a rotatable beater provided with toothed mechanism, hooked teeth removably secured at points forward of the rotatable beater extending rearwardly over the beater with their hooks arranged at an angle to their main body portions, and means for raising and lowering the hooked teeth.

10. In a fertilizer-spreader, the combination of a receptacle, a rotatable beater provided with tooth mechanism, a shaft rotatably mounted forward of the toothed beater, pulverizer-teeth mounted in such shaft, pivotally-mounted supporting mechanism upon which such toothed carrying-shaft is rotatably supported, and lever mechanism operatively connected with the shaft for operating it and thereby the pulverizer-teeth.

11. In a fertilizer-spreader, the combination of a receptacle having side frames and provided with an opening, a rotatable beater mounted adjacent to such opening and provided with tooth mechanism, a shaft rotatably mounted forward of and above the rotatable beater, hooked pulverizer-teeth mounted in such shaft, and means for rotating such shaft and thereby moving the hooked pulverizer-teeth into lowered position in front of the rotatable beater and to raised position adjacent to the rotatable-beater teeth.

12. In a fertilizer-spreader, the combination of a receptacle having side frames and provided with an opening, a rotatable beater mounted adjacent to such opening and provided with tooth mechanism, a shaft rotatably mounted forward of and above the rotatable beater, hooked pulverizer-teeth mounted on such shaft, means for rotating such shaft and thereby moving the hooked pulverizer-teeth into lowered position in front of the rotatable beater and to raised position adjacent to the rotatable-beater teeth, and a hood extending forward of and over the rotatable beater.

13. In a fertilizer-spreader, the combination of a receptacle, a rotatable beater provided with tooth mechanism, hooked teeth having their front ends mounted upon a rotatable shaft forward of the rotatable beater, means for raising and lowering such hooked teeth, and a hood pivotally secured at points forward of the beater and extending rearward from such pivotal points over the beater.

14. In a fertilizer-spreader, the combination of a portable receptacle, a rotatable beater, means for rotating such beater, a hood extending over the beater and pivotally secured at points forward of the axial center thereof, a shaft rotatably mounted in such hood, hooked pulverizer-teeth mounted in such rotatable shaft, and means for operating such shaft and thereby the hooked pulverizer-teeth mounted thereon.

15. In a fertilizer-spreader, the combination of a portable receptacle, a rotatable beater provided with tooth mechanism, means for rotating such beater, a hood mounted upon such receptacle and extending forward of and over the rotatable beater, and pulverizer-teeth extending from the upper portion of such hood rearward and downward and provided with inwardly-extending hooks at their lower ends adjacent to the tooth mechanism of the rotatable beater.

16. In a fertilizer-spreader, the combination of a portable receptacle, a rotatable beater provided with tooth mechanism, means for rotating such beater, a hood mounted upon such receptacle and extending forward of and over the rotatable beater, a series of pulverizer-teeth secured to such hood and extending over the rotatable beater back of the axial center thereof and having their lower ends adjacent to the teeth of the rotatable beater, and pulverizer-teeth mounted in such hood movable to lowered forward position to retain the contents of the receptacle and to rearward raised position with their hooked end portions adjacent to the teeth of the rotatable beater.

17. In a fertilizer-spreader, the combination of a portable receptacle, a rotatable beater provided with tooth mechanism, means for rotating such beater, a hood mounted upon such receptacle and extending forward of and over the rotatable beater, pulverizer-teeth extending from the upper portion of such hood rearward and downward and provided with inwardly-extending hooks at their lower ends adjacent to the tooth mechanism of the portable beater, a shaft rotatably mounted in such hood and provided with hooked pulverizer-teeth mounted thereon, and means for rotating such shaft and thereby moving the hooked pulverizer-teeth secured to such shaft to forward position for retaining the material contained in the receptacle and to raised rearward position adjacent to the tooth mechanism of the rotatable beater.

18. In a fertilizer-spreader, the combination of a portable receptacle having side frames and provided with an opening at the rear portion thereof, a rotatable-beater drum extending across such opening provided with slats extending longitudinally of the beater-drum such slats having laterally-extending flange portions forming paddles, and a series of beater-teeth secured to each of such slats and extending outwardly beyond and in engagement with the paddle or flange portions thereof.

19. In a fertilizer-spreader, the combination of a portable receptacle having side frames and provided with an opening at the rear portion thereof, a rotatable-beater drum extending across such opening provided with slats extending longitudinally of the beater-drum and having laterally-extending flange portions forming paddles, a series of beater-teeth secured to each of such slats and extending outwardly beyond the paddle or flange portions thereof, means for rotating such beater, and hooked pulverizer-teeth mounted independently of such rotatable beater and having their end portions at an angle to their main body portions and extending toward the beater when in raised operative position in staggered relation to the beater-teeth.

20. In a fertilizer-spreader, the combination of a portable receptacle, a rotatable-beater drum provided with a plurality of slats extending longitudinally thereof and having flange portions projecting outward laterally of the drum forming paddles, a series of beater-teeth mounted in each of such slats extending outward beyond the paddle portion thereof and in staggered relation to the beater-teeth of the next adjacent slats, hooked pulverizer-teeth movably mounted independently of and having their hooked ends adjacent to such beater-teeth and in staggered relation thereto, means for operating the rotatable beater, and means for operating the hooked pulverizer-teeth.

21. In a fertilizer-spreader, the combination of a portable receptacle having side frames and an open rear end portion, a rotatable beater mounted adjacent to the open rear end portion and provided with trunnions, supporting-arms secured to the rear end portion of the receptacle, transversely-movable bearing-boxes pivotally suspended on said supporting-arms in which bearing-boxes the trunnions of the beater are journaled, and a movable apron forming a bottom for the receptacle.

JOHN H. JESSEN.

Witnesses:
HARRY I. CROMER,
NORMAN A. STREET.